US007891553B2

(12) United States Patent
Kong et al.

(10) Patent No.: US 7,891,553 B2
(45) Date of Patent: Feb. 22, 2011

(54) DEVICE OF SUPPLYING PAPER MEDIUM

(75) Inventors: Je Seok Kong, Busan (KR); Won Joon Lee, Seoul (KR); Jin Hwan Cha, Gyeonggi-do (KR); Young Il Choi, Seoul (KR)

(73) Assignee: Nautilus Hyosung Inc., Seoul (KR)

( * ) Notice: Subject to any disclaimer, the term of this patent is extended or adjusted under 35 U.S.C. 154(b) by 78 days.

(21) Appl. No.: 12/343,319

(22) Filed: Dec. 23, 2008

(65) Prior Publication Data

US 2009/0166372 A1 Jul. 2, 2009

(30) Foreign Application Priority Data

Dec. 31, 2007 (KR) ...................... 10-2007-0141765

(51) Int. Cl.
*G06Q 40/00* (2006.01)

(52) U.S. Cl. ................................ 235/379; 902/8; 902/9

(58) Field of Classification Search ................. 235/379; 271/3.18, 3.1, 35; 902/8
See application file for complete search history.

(56) References Cited

U.S. PATENT DOCUMENTS 4,216,952 A * 8/1980 McInerny ................ 271/10.11
4,596,540 A * 6/1986 F'Geppert ................... 474/253
RE35,243 E * 5/1996 Tolson ..................... 198/343.1
2003/0000957 A1* 1/2003 Brexel et al. ................ 221/129

* cited by examiner

*Primary Examiner*—Daniel A Hess
*Assistant Examiner*—Tabitha Chedekel
(74) *Attorney, Agent, or Firm*—Fenwick & West LLP

(57) ABSTRACT

Disclosed is a cash transaction machine. The cash transaction machine includes a main body including a medium inlet formed on a side of a lower portion thereof and a medium outlet formed on a side of an upper portion thereof, and providing a paper medium fed from the medium inlet to the medium outlet, a transfer module including a driving device mounted on the main body, and a plurality of circulation transfer belts cooperating with the driving device and transferring the paper medium, the plurality of circulation transfer belts being extended to the lower portion of the main body via the medium inlet, and an auxiliary adapter including an adapter box directly or indirectly mounted on the lower portion of the main body, and a belt guidance shaft mounted on the adapter box and positioning an extra part of the circulation transfer belt in the auxiliary adapter.

10 Claims, 7 Drawing Sheets

DEVICE OF SUPPLYING PAPER MEDIUM

CROSS-REFERENCE TO RELATED APPLICATION

This application claims the benefit of Republic of Korea Patent Application No. 10-2007-0141765, filed on Dec. 31, 2007, in the Korean Intellectual Property Office, the disclosure of which is incorporated herein by reference.

BACKGROUND

1. Field of the Invention

The present invention relates to an automatic cash transaction machine, and more particularly, to an automatic cash transaction machine that may have a structure easily increasing a number of medium storage portions.

2. Description of the Related Art

In general, a cash transaction machine provides basic financial services such as money depositing/dispensing without a bank teller regardless of time and location. The cash transaction machine is classified into a cash dispensing machine and a cash depositing/dispensing machine depending on money being deposited/dispensed. Recently, the cash transaction machine has been used for multiple purposes such as a check reception/dispensing, bank book update, Giro payment, ticket dispensing, and the like, in addition to the money reception/dispensing.

In general, the cash transaction machine may pick up and transfer a paper medium in a sheet unit from a paper medium storage portion, and the transferred paper medium may be directly moved to a dispensing portion or temporarily stored in a temporary stack portion, and then moved to the dispensing portion. In a case of using the temporary stack portion, the paper medium may be provided to a customer in a stack unit. However, the paper medium stored in the temporary stack portion may need to be arranged to be transferable to a transfer device for transferring the paper medium in a stack unit, and the transfer device may need to transfer a sheet or several sheets of the paper medium, whereby the paper medium in the stack unit is required to be appropriately pressed and transferred.

Also, the cash transaction machine may generally have a single medium storage portion, however, may be designed to have five medium storage portions or more. Specifically, the cash transaction machine may include a plurality of cassettes mounted thereon, and identical or heterogeneous paper media may be provided through the plurality of cassettes. However, a number of medium storage portions may greatly vary according to requests of customers such as in a bank, and a cash transaction machine manufacturer may suffer a burden from manufacturing different types of cash transaction machines every time the number of medium storage portions varies.

In order to solve the above-mentioned problem, a cash transaction machine including an expandable medium storage device mounted below a main body of the cash transaction machine may be suggested, however, there may exist a difficult burden of functionally connecting the main body and the medium storage device every time the medium storage device is supplemented.

A cash transaction machine according to the present invention in which an expandable medium storage device may be supplemented below the main body, and the medium storage device may be driven together using a belt mounted on the main body is disclosed.

A cash transaction machine according to the present invention in which a plurality of cassettes may be mounted in the cash transaction machine using a single belt, and an extra part of the belt other than the belt used in mounting the cassettes on the cash transaction machine may be easily processed in an adapter box is disclosed.

A cash transaction machine according to the present invention in which a number of medium storage devices may be easily adjusted regardless of the extra part of the belt is disclosed.

SUMMARY

An aspect of the present invention is to provide a cash transaction machine in which an expandable medium storage device may be supplemented below the main body, and the medium storage device may be driven together using a belt mounted on the main body.

Another aspect of the present invention is to provide a cash transaction machine, in which a plurality of cassettes may be mounted in the cash transaction machine using a single belt, and an extra part of the belt other than the belt used in mounting the cassettes on the cash transaction machine may be easily processed in an adapter box is disclosed.

Still another aspect of the present invention is to provide a cash transaction machine a number of medium storage devices may be easily adjusted regardless of the extra part of the belt, which is not used for transferring the paper medium.

According to an aspect of the present invention, there is provided a cash transaction machine, including: a main body; a transfer module mounted on the main body and transferring a paper medium from a medium storage portion of a main body; and an auxiliary adapter directly or indirectly connected with a lower portion of the main body and processing a remaining part of a belt expanded downward.

In this instance, the main body may include a medium inlet formed on a side of a lower portion thereof and a medium outlet formed on a side of an upper portion thereof, and further include a medium inspection portion, a temporary stack portion, a medium withdrawal portion, and the like mounted inside thereof. Also, the main body may basically include the medium storage portion formed therein. Specifically, the paper medium may be provided from an expanded storage device, which will be described in detail below, without the medium storage portion, however, the main body may basically include one or two medium storage portions mounted therein.

Also, the transfer module may include a driving device mounted on the main body, and a circulation transfer belt cooperating with the driving device and transferring the paper medium. In this instance, one or a plurality of circulation transfer belts may be provided, and the plurality of circulation transfer belts may be rotated parallel to each other. Here, the paper medium may be a sheet-shaped article having a prescribed value and information such as paper money, a check, an exchange ticket, and the like. The transfer module may include a plurality of pulleys for defining a transfer path of the circulation transfer belt, and the circulation transfer belt may be revolved along a prescribed transfer path.

In particular, the circulation transfer belt may be expanded and exposed below the main body as well as being revolved inside the main body, and the circulation transfer belt exposed below the main body may provide a driving force transferring the paper medium while passing through the auxiliary adapter or the expanded storage device. Accordingly, the cash transaction machine of the present invention may have a simple structure transmitting the driving force.

In addition, the circulation transfer belt may be exposed below the main body or the expanded storage device, and the auxiliary adapter processing the circulation transfer belt may be provided. A dummy module having no functions may be mounted instead of the auxiliary adapter, as necessary, however, this may also have problems in terms of different aspects. According to the present invention, by using the auxiliary adapter, a total height of a multi-layered structure may be reduced, and expansion and reduction of the multi-layered structure may be easily performed.

Also, the auxiliary adapter may include an adapter box and a belt guidance shaft mounted inside the adapter box. The adapter box may be directly mounted on the main body, or mounted on the lower portion of the expanded storage device, and the belt guidance shaft may position an extra part, unused for transferring the paper medium, of the circulation transfer belt in the auxiliary adapter. The belt guidance shaft may be fixed on a prescribed location inside the adapter box, and may vary its fixed location depending on a length of an extra part of the belt other than the belt used in mounting cassettes.

The expanded storage device may be mounted between the main body and the auxiliary adapter, and may be additionally mounted below the main body according to a number of the expanded storage devices necessary. The expanded storage device may include a medium storage portion storing the paper medium, and a belt corresponding portion defining a transfer path of the paper medium to correspond to the circulation transfer belt. The circulation transfer belt may pass through the expanded storage device and make a detour inside the auxiliary adapter.

The expanded storage device and the auxiliary adapter may be additionally mounted on a lower portion of the main body, and thus a total height reaching from the main body to the auxiliary adapter may vary according to a number of the mounted expanded storage devices. Comparing the lower portion of main body, an upper portion of the main body may be mounted on an inner top surface of the cash transaction machine, and may be slidingly movable with respect to the inner top surface of the cash transaction machine.

BRIEF DESCRIPTION OF THE DRAWINGS

The above and/or other aspects and advantages of the present invention will become apparent and more readily appreciated from the following detailed description, taken in conjunction with the accompanying drawings.

DETAILED DESCRIPTION

Figure 1:
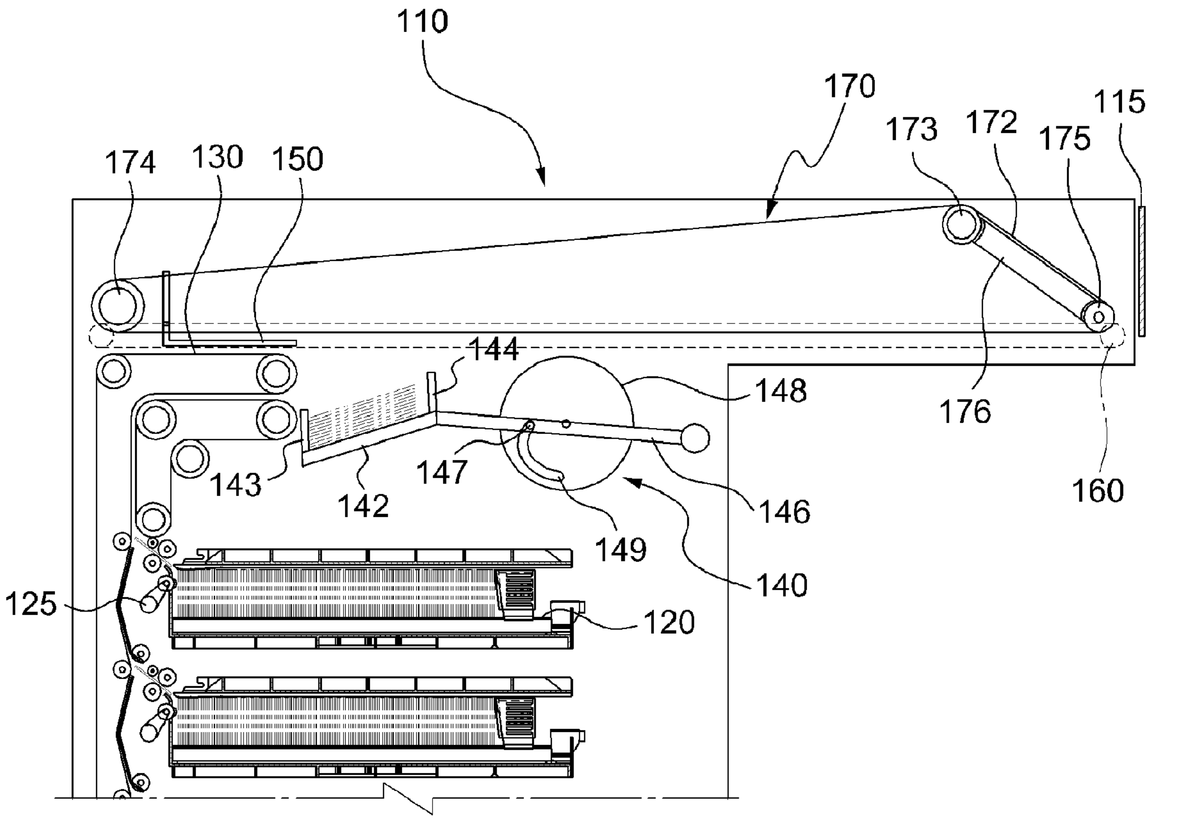
FIG. 1 is a side view showing a cash transaction machine according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 2:
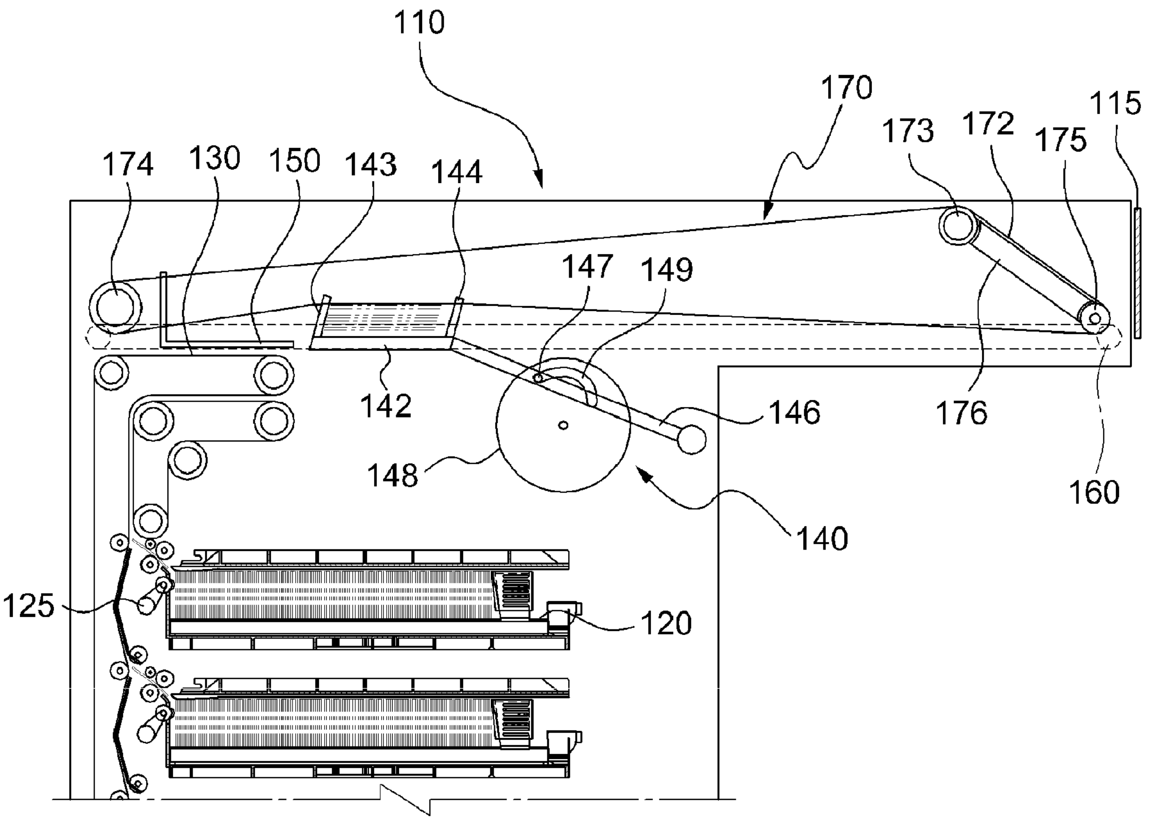
FIG. 2, FIG. 3, and FIG. 4 are side views showing an operation mechanism of the cash transaction machine of FIG. 1.
Figure 3:
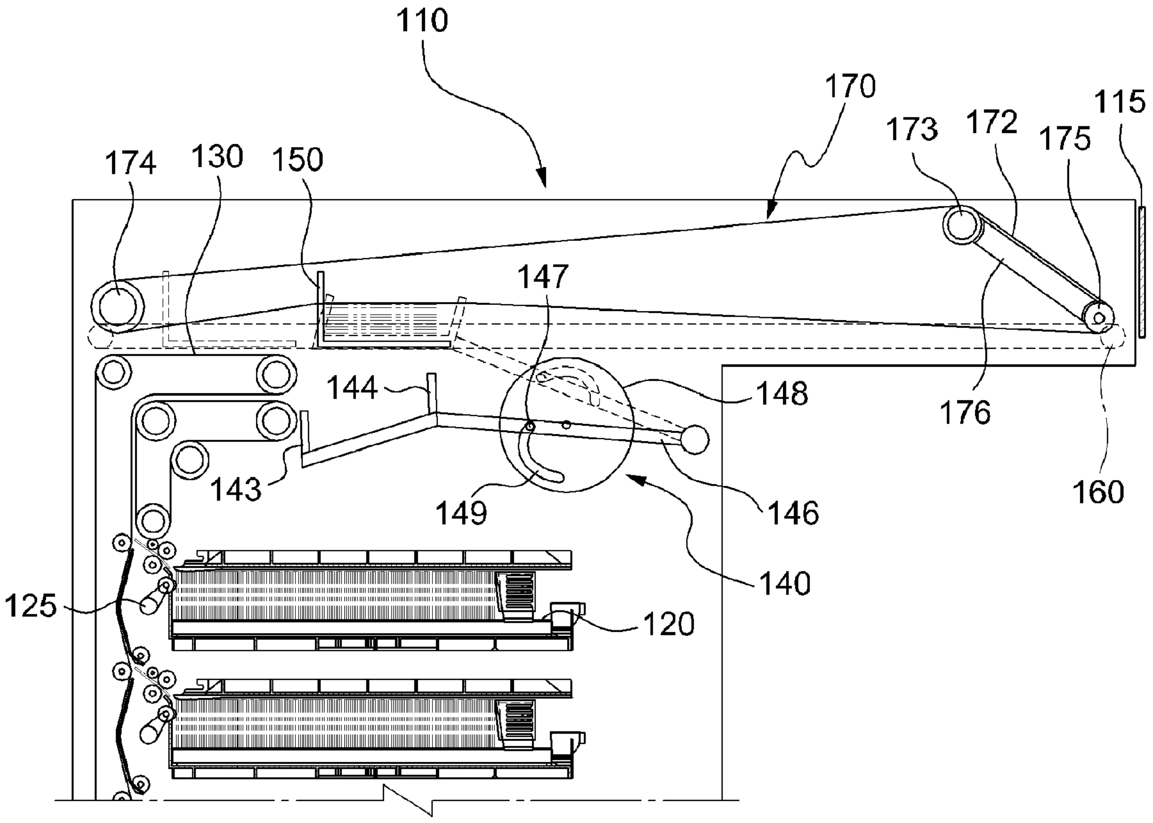
Figure 4:
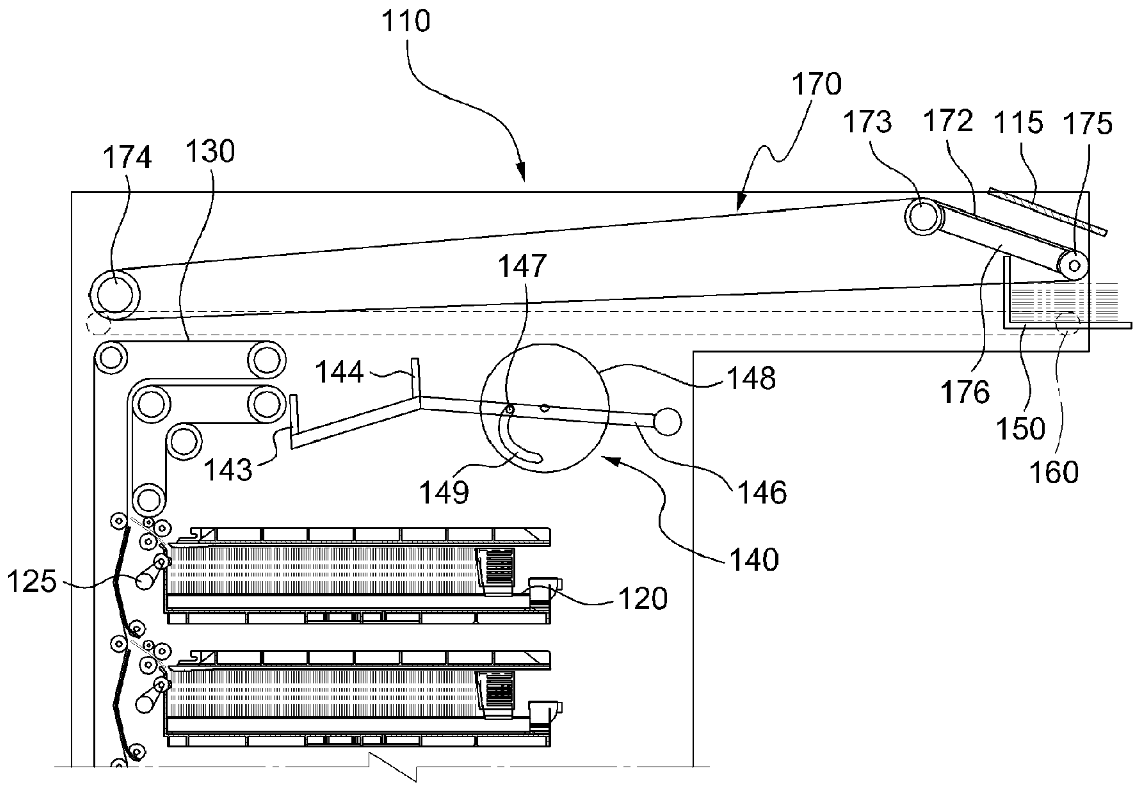

FIG. 1 is a side view showing a cash transaction machine 100 according to an exemplary embodiment of the present invention, and FIGS. 2 to 4 are side views showing an operation mechanism of the cash transaction machine of FIG. 1.

Referring to FIG. 1, the cash transaction machine 100 according to the present exemplary embodiment may include a medium storage portion 120, a medium transfer module 130, a temporary stack portion 140, a carriage 150, a carriage transfer portion 160, and a belt pressing portion 170, each mounted in a housing 110. A paper medium (P) may be picked-up in the medium storage portion 120 in a sheet unit and provided, and the provided paper medium (P) may be transferred to the temporary stack portion 140 through the medium transfer module 130. The paper medium (P) provided in a sheet unit may be stacked in the temporary stack portion 140, and then a stack of the paper medium of the temporary stack portion 140 may be transmitted to a carriage 150 when a desired amount of the paper medium (P) are stacked. The stack of the paper medium transmitted to the carriage 150 may move to a medium outlet 115 together with the carriage 150, and the paper medium may be dispensed in a stack unit to a customer at the medium outlet 115. In this instance, the belt pressing portion 170 may pressure an upper surface of the stack of the paper medium transmitted by the carriage 150 to thereby enable the paper medium to be stably maintained without being scattered while the carriage is moving or while the paper medium is being rejected. Hereinafter, the above-mentioned functions will be described in detail.

The medium storage portion 120 may store the paper medium (P) such as paper money, a check, an exchange ticket, and the like, and a main controller (not shown) of the cash transaction machine may command that a certain amount of the paper medium is dispensed from the stored paper medium (P) when a customer wishes to withdraw a predetermined amount of the paper medium. In this instance, a pick-up module 125 may be internally or externally mounted in the medium storage portion 120, and the pick-up module 125 may pick-up a certain amount of the paper medium from the medium storage portion 120. In general, the pick-up module 125 may include a pick-up roller, a feed roller, a gate roller, a pinch roller, and the like, and configurations and functions thereof may be apparent to a skilled person in the art, and thus detailed description thereof will be omitted.

The paper medium picked-up and provided from the medium storage portion 120 may be transmitted to the temporary stack portion 140 through the medium transfer module 130. The medium transfer module 130 according to the present exemplary embodiment may utilize a transfer scheme using a belt and roller, however, may utilize a transfer scheme using a roller and guidance plate, as necessary. An outlet of the medium transfer module 130 may be connected with the temporary stack portion 140, and the paper medium may be stacked in a sheet unit in the temporary stack portion 140.

Referring to FIG. 1, the temporary stack portion 140 according to the present exemplary embodiment may include a supporter 142, a front partition wall 144, a rear partition wall 143, a rotation supporter 146, and a rotation guide 148. The supporter 142 and the rotation supporter 146 may be integrally formed, and the supporter 142 may be upwardly and downwardly movable depending on rotation operations of the rotation supporter 156. Specifically, the supporter 142 may be located adjacent to the outlet of the medium transfer module 130, and also may be upwardly moved so as to transmit the paper medium to the carriage 150.

Also, the front partition wall 144 and rear partition wall 143 may be respectively provided at front and rear ends of the supporter 142. The front partition wall 143 may interrupt an advancement of the paper medium transmitted from the medium transfer module 130, and the advancement of the paper medium may be interrupted for a period of time by the front partition wall 144 when a sheet roller is mounted in the outlet of the medium transfer module 130, and then the paper medium may be downwardly guided by the sheet roller. The rear partition wall 143 may guide the paper medium to be stacked on the supporter 142 in a state of being arranged. In this instance, the supporter 142 may be provided as being downwardly slanted in front of the outlet of the medium transfer module 130, so that the paper medium is neatly arranged.

Also, as shown in FIG. 1, the rotation guide 148 may include a spiral guidance groove 149 formed thereon, and the radius of the spiral guidance groove 149 may vary depending on a rotation angle. The rotation supporter 146 may include a protrusion 147 engaged with the guidance groove 149. Accordingly, when the rotation guide 148 is rotated clockwise, the rotation supporter 146 may ascend, and when the rotation guide 148 is rotated counterclockwise, the rotation supporter 146 may descend.

According to the present exemplary embodiment, the above-mentioned temporary stack portion 140 may be provided, however, according to other exemplary embodiments various types of temporary stack portions may be provided, and the present invention may not be limited thereto. Also, various types of devices for ascending the supporter, which may be well-known to a skilled person in the art, may be used.

The carriage 150 may be provided to have a structure of being partially overlapped with the supporter 142 of the temporary stack portion 140, and may be generally formed into a fork shape having a plurality of supporters. When the supporter 142 is upwardly moved, the carriage 150 is moved forward so that a lower portion of the carriage 150 is inserted into the supporter 142, wherein the lower portion of the carriage 150 is located on a bottom surface of the paper medium.

Also, the belt pressing portion 170 may be provided above the carriage 150. The belt pressing portion 170 may press the upper surface of the paper medium while the carriage 150 is moving, wherein the paper medium is stably transferred without being scattered. To press the upper surface of the paper medium, the belt pressing portion 170 may include a belt 172 pressing the upper surface of the paper medium, a plurality of guidance rollers 173 to 175 defining a travel path of the belt 172, and a tension spring 180 connecting both ends of the belt 172. The belt 172 may be provided with two-folds or more so as to stably press the paper medium.

The plurality of guidance rollers may include a front fixed roller 173, a rear fixed roller 174, and a front moving roller 175 vertically swiveled while maintaining a certain distance with the front fixed roller 173. A support member 176 between the front moving roller 175 and the front fixed roller 173 may be interposed. Specifically, the support member 176 may be mounted on a rotation shift of the front fixed roller 173, and the front moving roller 175 may be rotatably mounted on an end of the supporter member 176. Accordingly, the front moving roller 175 may be vertically swiveled together with the support member 176, whereby the front moving roller 175 can ascend together with the supporter member 176 when the carriage 150 approach the front moving roller 175, and descend when the carriage 150 is withdrawn from the front moving roller 175.

The belt 172 may be suspended without regard to the carriage 150, however, may be preferably moved by the same displacement as that of the movement of the carriage 150 in order to reduce friction between the belt 172 and the paper medium. To move by the same displacement, the belt 172 or the plurality of guidance rollers 173 to 175 may cooperate with a carriage transfer portion 160. Various methods in which the carriage transfer portion 160 and the belt 172 cooperate with each other may be used.

As an example, the carriage transfer portion 160 may include a separate driving belt for cooperating with the belt pressing portion 170 provided outside the belt pressing portion 170. The carriage 150 may be fixed on the driving belt mounted outside the belt pressing portion 170, so that the carriage is moved along the driving belt. In this instance, the belt 172 of the belt pressing portion 170 may be in a free rotation state or in an idle state, whereby the belt 172 is circulated together with the paper medium. However, upon reverse rotation in a state where a shaft of the belt 172 and a shaft of the carriage transfer portion 160 are connected with each other using a one-way clutch, the belt 172 and the carriage transfer portion 160 may be simultaneously moved. The present exemplary embodiment may adapt the above-mentioned configuration of the belt 172 and the carriage transfer portion 160.

As another example, a method for directly connecting the belt 172 of the belt pressing portion 170 and the carriage 150 with each other may be used. In this instance, the belt 172 of the belt pressing portion 170 may be directly connected with the carriage transfer portion 160, and the carriage 150 may be indirectly connected with the carriage transfer portion 160 through the belt 172. In this case, another separate belt other than the belt 172 of the belt pressing portion 170 may not need to be mounted.

As illustrated in FIG. 2, when a desired amount of the paper medium (P) is stacked on the supporter 142 of the temporary stack portion 140, the rotation guide 148 may be rotated clockwise to enable the supporter 142 to ascend. In this instance, the paper medium (P) stacked on the supporter 142 may be brought into contact with a bottom surface of the belt pressing portion 170, and be maintained to be in a neatly arranged state by the belt 172.

Referring to FIG. 3, the carriage 150 may move forward, and may be overlapped with the supporter 140 of the temporary stack portion 140. In this instance, a lower portion of the carriage 150 may be inserted into the supporter 142 along a groove of the supporter 142, and only the paper medium (P) may remain on the carriage 150 while the temporary stack portion 140 is descending when the rotation guide 148 is rotated counterclockwise to enable the supporter 142 to descend.

Referring to FIG. 4, the carriage 150 may move to the medium outlet 115 together with the paper medium (P). However, the front moving roller 175 may move upwardly while the carriage 150 is moving to the medium outlet 115, and the paper medium (P) may be provided in a stack unit through the medium outlet 115. Then, the paper medium (P) may be dispensed to a customer.

Figure 5:
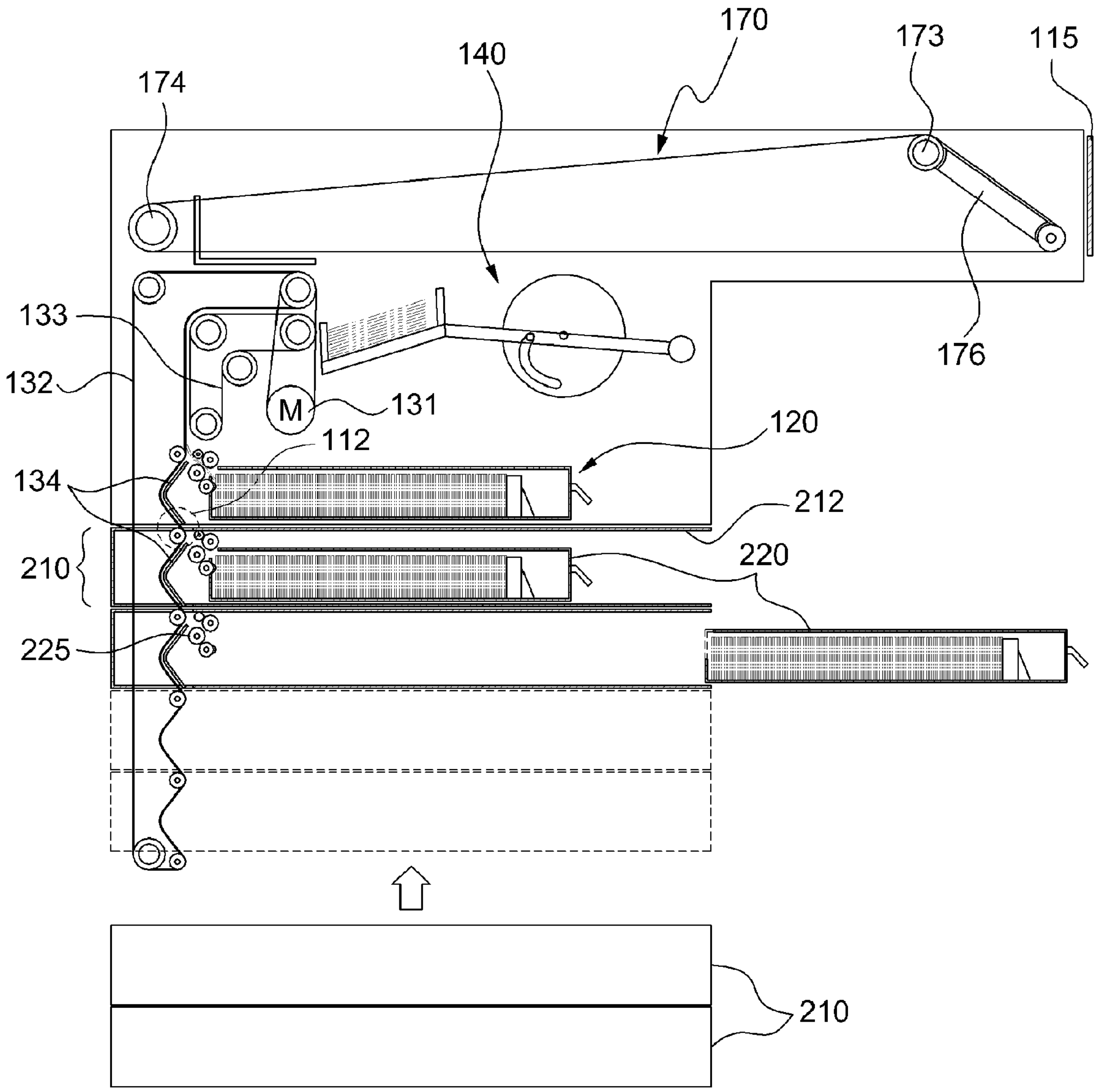
FIG. 5 is a side view showing a cash transaction machine according to another exemplary embodiment of the present invention.
Figure 6:
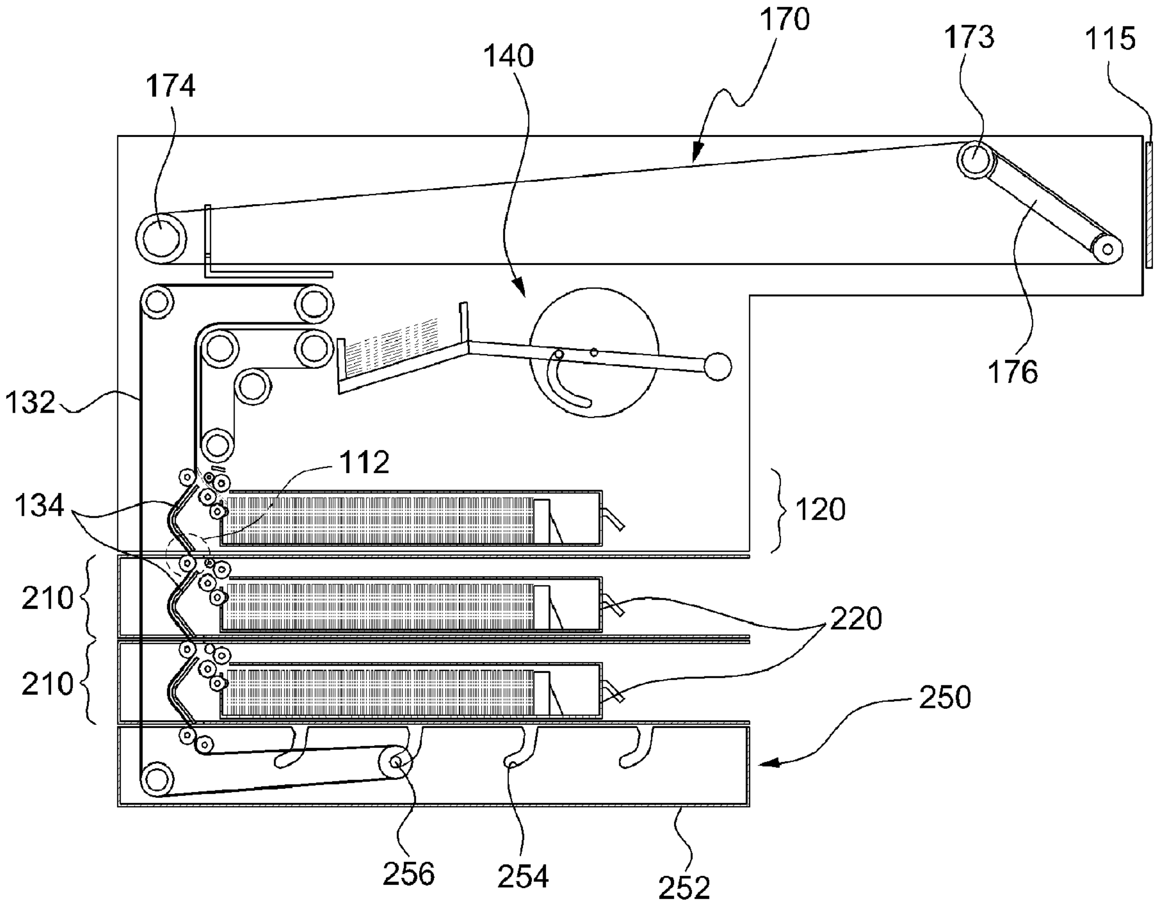
FIG. 6 is a side view showing a cash transaction machine according to still another exemplary embodiment of the present invention.

FIG. 5 is a side view showing a cash transaction machine according to another exemplary embodiment of the present invention, and FIG. 6 is a side view showing a cash transaction machine according to still another exemplary embodiment of the present invention.

Referring to FIG. 5, the cash transaction machine may include a main body 110, and an expanded storage device 210 mounted on a lower portion of the main body 110. The main body 110 may basically include a single medium storage portion 120 mounted therein, and also include the temporary stack portion 140, the carriage 150, the carriage transfer portion 160, and the belt pressing portion 170 mounted therein. In this instance, the medium storage portion, the temporary stack portion, the carriage, the carriage transfer portion, and the belt pressing portion are the same as in FIGS. 1 to 4, and thus detailed descriptions thereof will be herein omitted.

The main body 110 may include a medium inlet 112 formed on a side of a lower portion thereof, and a medium outlet 115 formed on a side of an upper portion thereof. A plurality of circulation transfer belts 132 may be extended to the lower portion of the main body 110 via the medium inlet 112, and the paper medium may be fed into the main body 110 by circulation of the circulation transfer belt 132. The paper medium fed into the main body 110 may be transmitted to the medium outlet 115 by cooperating operations of the temporary stack portion 140, the carriage 150, and the belt pressing portion 170.

For reference, according to the present exemplary embodiment, the main body 110 may basically include the single medium storage portion 120, and may additionally include the expanded storage device 210 mounted on the lower portion of the main body 110. A number of basically provided medium storage portions 120 may vary according to requests of a user, and the main body may be provided with only the expanded storage portions 210 without the basically provided medium storage portion, as necessary.

Referring again to FIG. 5, the medium transfer module 130 may include a driving device 131 and the circulation transfer belt 132. The circulation transfer belt 132 may define a boundary of on surface of an entire transfer path, and may be circulated along a prescribed path using a pulley. A transfer guidance plate 134 may be provided in front of the medium storage portion 120 to correspond to the circulation transfer belt 132. In this instance, the circulation transfer belt 132 and the transfer guidance plate 134 may be in close contact to face each other, and may form a part of a vertical transfer path of the paper medium.

As illustrated in FIG. 5, the circulation transfer belt 132 may be in close contact with another belt 133 to form a part of another transfer path of the medium paper.

The circulation belt 132 may be extended downward via the medium inlet 112 of the main body 110. According to the present exemplary embodiment, up to four expanded storage devices 210, other than the basically provided medium storage portion 120, may be additionally mounted. Accordingly, the circulation transfer belt 132 may be formed to have a sufficient length considering the four expanded storage devices 210. As illustrated in FIG. 5, the circulation transfer belt 132 may be formed to have a sufficient length for circulation from the main body 110 to the lowest expanded storage device 210.

The expanded storage device 210 may include an expanded main body 212, a cassette 220, a pick-up division portion 225, and the transfer guidance plate 134. The cassette 220 may be inserted and mounted in the expanded main body 212 in a state of storing the paper medium, and at the same time the paper medium and the pick-up division portion 225 may be brought into close contact with each other in such a manner as to be operated. The pick-up division portion 225 may include a pick-up roller, a feed roller, a gate roller, a pinch roller, and the like, and the pick-up roller and the feed roller may be driven by a driving device that is the same as or different from the medium transfer module 130. Also, the pick-up division portion 225 may be externally or internally provided with respect to the cassette. According to the present exemplary embodiment, the pick-up division portion 225 may be mounted on the expanded main body 212 of the expanded storage device 210 that is different from the cassette.

In the expanded storage device 210, the transfer guidance plate 134 may be located in front of the cassette 220. The transfer guidance plate 134 may provide a mountain-shaped transfer path that is expanded in a horizontal direction with respect to an advancement direction of the paper medium, and the paper medium may maintain to be in close contact with the circulation transfer belt 132 while moving along the mountain-shaped transfer guidance plate 134. In this instance, the circulation transfer belt 132 may also move along the transfer guidance plate 134.

The cash transaction machine of FIG. 5 may be provided with four expanded storage devices 210, however, according to the present exemplary embodiment, only two expanded storage devices 210 may be mounted in the cash transaction machine, and the circulation transfer belt 132 may be exposed below the two expanded storage device 210.

Hereinafter, a method for arranging the downwardly exposed circulation transfer belt 132 using an auxiliary adapter 250 will be described in detail.

Referring to FIG. 6, the auxiliary adapter 250 may be mounted to a lower portion of the expanded storage device 210.

Accordingly the expanded storage device 210 and the auxiliary adapter 250 may be additionally mounted on the lower portion of the main body 110, and a total height reaching from the main body 110 to the auxiliary adapter 250 may vary according to a number of the mounted expanded storage devices 210.

The auxiliary adapter 250 may be indirectly mounted to the lower portion of the main body 110 interposing the expanded storage device 210, and may receive an extra part, not used for transferring the paper medium, of the downwardly exposed circulation transfer belt 132.

For receiving the extra part of the circulation transfer belt 132, the auxiliary adapter 250 may include an adapter box 252 and a belt guidance shaft 256. The adapter box 252 may include an opened upper surface or opened lower surface, and a plurality of shaft fixing slits 254 formed on side surfaces of the adapter box 252 facing each other through the opened lower surface or opened upper surface of the adapter box 252, so that the belt guidance shaft is inserted in the shaft fixing slit. The plurality of shaft fixing slits 254 may be formed to have a predetermined distance therebetween, so that the belt guidance shaft 256 on which the circulation transfer belt 132 is wound is inserted and fixed in the shaft fixing slits 254 by changing locations of the belt guidance shaft 256, thereby adjusting an extra part of the downwardly exposed circulation transfer belt 132.

Each of the plurality of shaft fixing slits 254 may be formed to be inclined, so that the belt guidance shaft 256 may be easily inserted in the shaft fixing slits 254. Each of the plurality of shaft fixing slits 254 may further include a shaft seating portion 255 formed on an inner end of the shaft fixing slits, so that the belt guidance shaft 256 is fixed in the shaft fixing slits 254.

Figure 7:
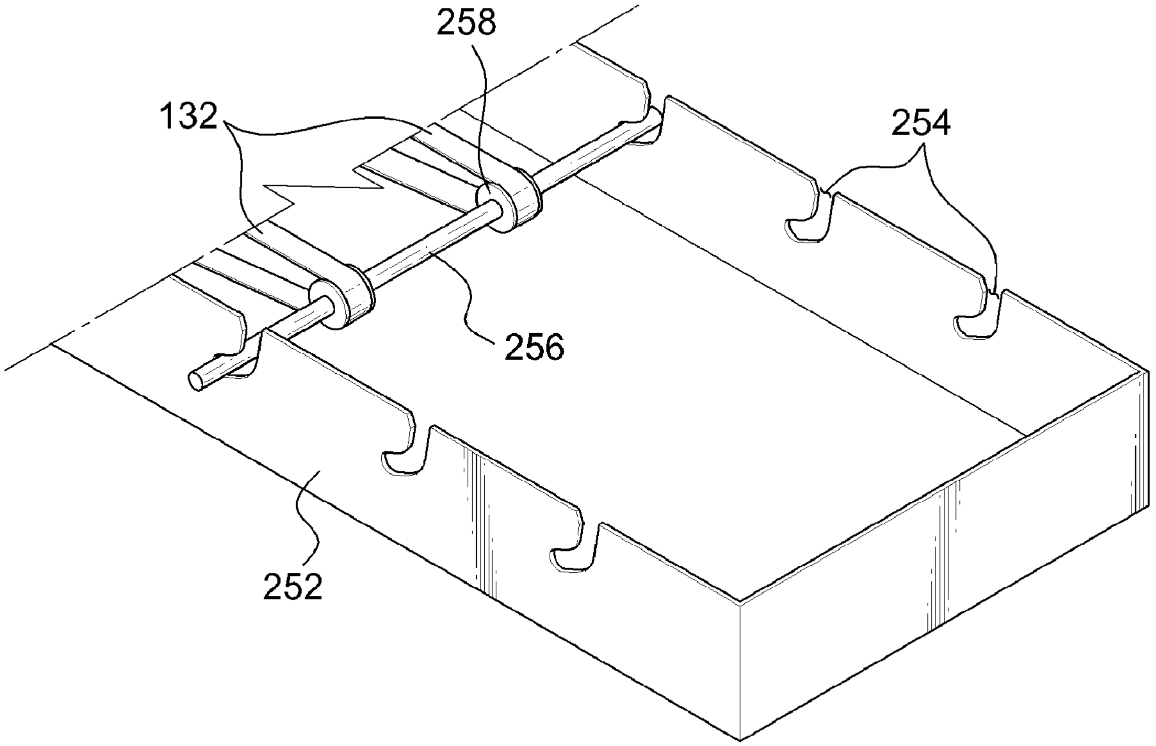
FIG. 7 is a partial expanded perspective view showing an auxiliary adapter of FIG. 6.

FIG. 7 is a partial expanded perspective view showing an auxiliary adapter of FIG. 6.

Referring to FIG. 7, the plurality of shaft fixing slits 254 used for receiving the belt guidance shaft 256 therein may face each other on the side surfaces of the adapter box 252, and a plurality of pulleys 258 may be mounted on the belt guidance shaft 256. In this instance, a bearing may be provided between the belt guidance shaft and the pulley 258, so that the pulley 258 is freely rotated on the belt guidance shaft 256.

Also, a D-cut processing may be performed on end portions of the belt guidance shaft 256 and shaft fixing slit 254, so that the belt guidance shaft 256 is prevented from being rotated, and only the pulley 256 is rotated on the belt guidance shaft 256. As a result, a vicinity of the shaft fixing slit 254 may be prevented from being worn due to rotation of the belt guidance shaft 256.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A cash transaction machine comprising:

a main body including a medium inlet formed on a side of a lower portion thereof and a medium outlet formed on a side of an upper portion thereof, and providing a paper medium fed from the medium inlet to the medium outlet;

a transfer module including a driving device mounted on the main body, and at least one circulation transfer belt operated by the driving device for transferring the paper medium to the main body from each of a plurality of medium storage portions, each of the plurality of medium storage portions storing a plurality of paper media, the at least one circulation transfer belt being extended to the lower portion of the main body via the medium inlet; and an auxiliary adapter mounted in place of one or more of the plurality of medium storage portions, the auxiliary adapter including:

an adapter box directly or indirectly mounted on the main body, and a belt guidance shaft mounted on the adapter box for disposing, in the adapter box, at least part of the circulation transfer belt made redundant by removing at least one of the plurality of medium storage portions from the cash transaction machine.

2. The cash transaction machine of claim 1, wherein the upper portion of the main body is mounted to the cash transaction machine in such a manner as to be horizontally moved.

3. The cash transaction machine of claim 1, further comprising:

at least one expanded storage device mounted between the main body and the auxiliary adapter and providing the paper medium, wherein the expanded storage device includes a medium storage portion storing the paper medium, and a belt corresponding portion defining a transfer path of the paper medium to correspond to the circulation transfer belt, and the redundant part of the circulation transfer belt passes through the expanded storage device and is positioned inside the auxiliary adapter.

4. The cash transaction machine of claim 3, wherein the belt corresponding portion includes a transfer guidance plate having a winding surface being in close contact with the circulation transfer belt.

5. The cash transaction machine of claim 3, wherein the expanded storage device includes a multi-layered expanded main body mounted on the lower portion of the main body, and a cassette detachably mounted on the expanded main body and storing the paper medium.

6. The cash transaction machine of claim 1, wherein the adapter box includes an opened upper surface or opened lower surface, and a plurality of shaft fixing slits formed on side surfaces of the adapter box facing each other through the opened lower surface or opened upper surface of the adapter box, and the belt guidance shaft is inserted in the shaft fixing slit to be rotated and adjusts a distance of the detour.

7. The cash transaction machine of claim 6, wherein the plurality of shaft fixing slits are formed in a slanted manner on the side surfaces.

8. The cash transaction machine of claim 7, wherein each of the plurality of the shaft fixing slits includes a shaft seating portion formed on an inner end of each of the plurality of the shaft fixing slits.

9. The cash transaction machine of claim 1, wherein a plurality of circulation transfer belts are circulated parallel to each other, and the belt guidance shaft includes a pulley mounted thereon to correspond to each of the plurality of circulation transfer belts.

10. The cash transaction machine of claim 9, wherein a bearing is provided between the pulley and the belt guidance shaft, and the pulley is freely rotated with respect to the belt guidance shaft by means of the bearing.

* * * * *